United States Patent [19]

Muhlberger et al.

[11] Patent Number: 4,533,900
[45] Date of Patent: Aug. 6, 1985

[54] SERVICE-INTERVAL DISPLAY FOR MOTOR VEHICLES

[75] Inventors: Heinz Muhlberger, Eching; Erwin Starmuhler, Munich; Walter Weishaupt, Munich; Peter Flohr, Munich; Fritz Bourauel, Munich, all of Fed. Rep. of Germany

[73] Assignee: Bayerische Motoren Werke Aktiengesellschaft, Fed. Rep. of Germany

[21] Appl. No.: 346,764

[22] Filed: Feb. 8, 1982

[30] Foreign Application Priority Data

Feb. 6, 1981 [DE] Fed. Rep. of Germany ....... 3104196

[51] Int. Cl.³ ............................................. B60Q 1/00
[52] U.S. Cl. .................. 340/52 R; 73/117.3; 340/52 D; 364/424; 364/569
[58] Field of Search ............ 340/52 R, 59, 52 D; 73/113, 117.3; 364/424, 431.01, 431.02, 431.03, 442, 569, 506, 900

[56] References Cited

U.S. PATENT DOCUMENTS

| | | | |
|---|---|---|---|
| 3,925,754 | 12/1975 | Ota | 340/52 D |
| 3,940,735 | 2/1976 | Kronenberg | 340/52 D |
| 3,972,022 | 7/1976 | Goto | 340/52 D |
| 4,129,034 | 12/1978 | Niles | 364/442 |
| 4,144,521 | 3/1979 | Lehnhert | 340/59 |
| 4,267,569 | 5/1981 | Baumann | 364/424 |
| 4,280,185 | 7/1981 | Martin | 364/431.01 |

Primary Examiner—James J. Groody
Assistant Examiner—Michael F. Heim
Attorney, Agent, or Firm—Craig & Burns

[57] ABSTRACT

A service interval display unit for a motor vehicle for alerting the operator of required maintenance wherein actual distance traveled by the vehicle is monitored, and as a factor in determining the service interval, operating parameters such as engine speed, coolant temperature, oil temperature, and/or fuel consumption rate are taken into consideration on a weighted basis to assert earlier a service signal in the display unit when the engine experiences increased periods of higher loads. The display unit includes a series of indicators which are successively extinguished upon attainment of subintervals during the maintenance cycle and warning lights which are energized after attainment of the service interval. Additional warning lights also are provided for emphasizing the expiration of the service interval when the vehicle is operated successive fixed distance intervals beyond the regular service interval.

12 Claims, 1 Drawing Figure

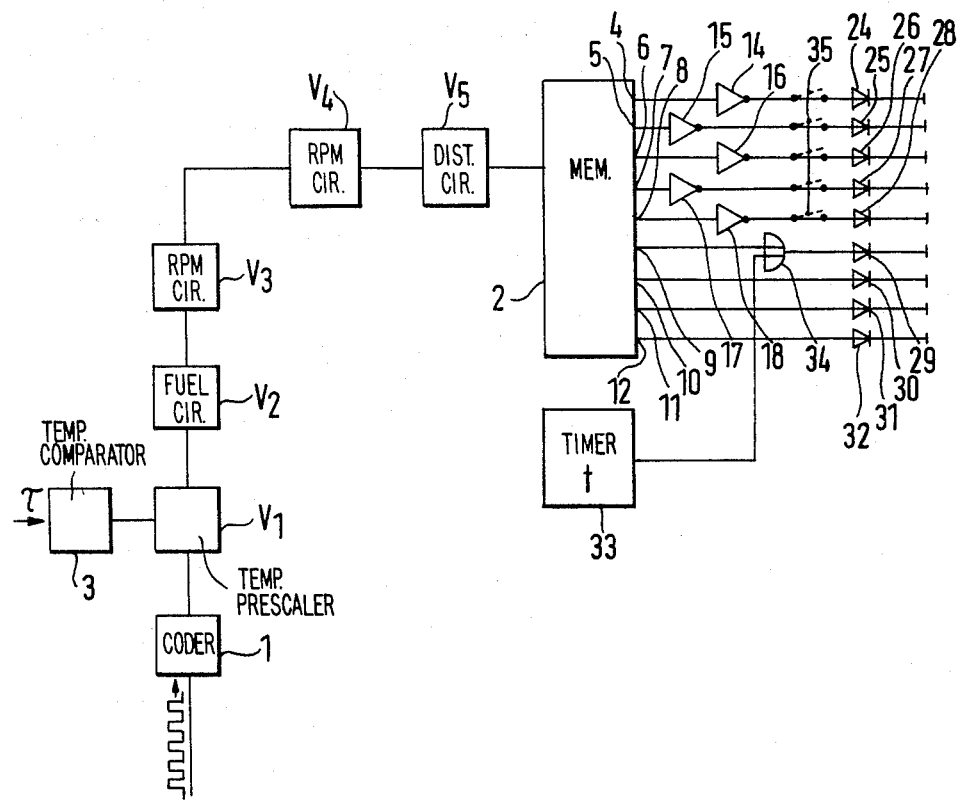

SERVICE-INTERVAL DISPLAY FOR MOTOR VEHICLES

The invention relates to a service-interval display for motor vehicles, which generates a maintenance alert signal after a fixed distance has been traveled as well as factors affecting the load on the engine.

In known displays of this type, the distance travelled is the only parameter monitored. The actual load on the engine is not monitored, however. Consequently, servicing is frequently performed much too early, since the fixed distance must be set so that service will be performed in proper time even under extreme loads on the engine, like those which occur for example in cold starts followed by hard acceleration. This results in unnecessarily high operating costs for a majority of vehicle owners. It is also disadvantageous from a economic standpoint, since parts which would still function reliably for a certain distance and could therefore be left in the vehicle are often replaced as a precaution.

The goal of the invention is to provide a display of the type recited hereinabove which indicates that servicing is necessary only when it is in fact required.

The solution to this problem consists of using fixed distance being made up of the actual distance travelled and an additional engine loading component being a function of the load on the engine.

The invention permits the service interval to be adjusted to match the actual needs. When the vehicle is driven gently, for example by avoiding extreme engine rpm values, the service interval can be stretched out longer than if the distance travelled were the only parameter monitored, or if the engine was subjected to especially extreme loads. Only a driving style which imposes extreme loads on the engine would make it necessary to perform service relatively frequently. Thus, the invention permits the vehicle to be operated more gently and consequently permits lower fuel consumption and longer service life of the vehicle.

The engine load can be monitored in different ways. Thus it is possible to combine the additional engine loading component with the distance-travelled factor. On the other hand, the additional loading component can be monitored simply and with high accuracy by using a circuit in which the load is a factor by which the distance travelled prior to its recording is multiplied. A multiplication of this sort can be performed for example by using processors to which distance-travelled pulses corresponding to the distance travelled are fed and which are blocked when the engine is under extreme load.

This operation can be implemented in different ways. Thus, for example, the modifying factor can be made operable only at an extreme value of an operating parameter. The modifying factor can then be rendered operational as long as the extreme value exists or until a preset distance has been travelled.

However, the modifying factor can also be made effective only as long as the value of the operating parameter remains below a preset limit. In this case, the factor would also be effective only during an extreme load on the engine, while it would not appear under a "normal" load. Consequently, the computing cost can be kept low as well.

A factor which is effective only when an operating parameter reaches an extreme value can be constant or can change as a function of the value of the operating parameter. While a constant factor can be monitored at a low computing cost, a changing factor has the advantage that the additional amount produced by the factor can be selected to match the actual requirements and the service interval can be preset optimally.

Further optimization of the service interval can be achieved by segmenting the factor into several parts which are associated with different respective operating parameters. Since an excessive load on the engine can occur when various parameters reach extreme values, the service interval can be set exactly by monitoring all or most of these parameters.

Modifying factors can be the engine rpm, the temperature of an operating fluid such as the coolant or engine oil, and/or the fuel consumption rate. Moreover, transducers are already provided for all criteria in conventional motor vehicles, so that this criterion can be monitored at low equipment cost.

Within the scope of the invention, an additional advantageous measure can involve dividing the fixed distance into equal intervals, and initially energizing a pilot light for each of these intervals, said light being sequentially extinguished at the end of each of the respective intervals. By dividing the distance into intervals in this way, an especially stressful driving style can be detected even before the fixed distance has been travelled, since the pilot lights for the corresponding intervals are then extinguished in a perceptibly more rapid sequence.

Frequently, it will suffice to turn on the pilot lights only before starting the engine, and to extinguish them when the engine starts or afterward. Thus, each time he starts the engine, the driver is provided with information about the distance remaining, and is also not disturbed by the pilot lights as he drives.

In addition to the pilot lights, warning lights which remain lit after equal distance intervals have been travelled can be provided, said lights coming on after the fixed distance has been travelled. These distance intervals can also be determined by estimating the distance travelled. The driver thus receives information on the necessity of maintenance with increasing urgency.

In order to indicate that servicing is required, even when the annual distance travelled by the vehicle is extremely short, a fixed time can be associated with the fixed distance, with the signal appearing after this time has elapsed. In such cases, servicing is made necessary by an aging phenomena, for example, of the operating fluids. These are phenomena which are not important for "normal" operation and travel. Thus, even so-called "occasional drivers" have their service intervals optimized and are informed at the proper time that servicing is required.

It is thus an object of the invention to produce a service-interval display for motor vehicles, which generates a maintenance alert signal after a fixed distance has been travelled, the distance being composed of the actual distance travelled and an additional engine loading component, the component being generated as a function of the load on the engine.

It is a further object of the invention to produce a service-interval display for motor vehicles wherein the load on the engine is monitored by a factor which affects the distance travelled, as recorded.

It is another object of the invention to provide a service-interval display for motor vehicles wherein the load on the engine is monitored by a factor which affects the distance travelled as recorded, only when the operating parameter of engine load is at an extreme value.

It is another object of the invention to provide a service-interval display for motor vehicles wherein a factor of engine load operating at an extreme value serves to modify the distance as recorded only as long as the value of the operating parameter is above a predetermined limiting value.

It is another object of the invention to provide a service-interval display for motor vehicles wherein a parameter of engine load which serves to affect the distance travelled, as recorded, may be constant or may change as a function of the value of the operating parameter.

It is another object of the invention to provide a service-interval display for motor vehicles wherein a parameter which affects the recording of distance travelled may be temperature of an operating fluid, such as a coolant or engine oil, engine rpm and/or fuel consumption rate.

It is another object of the invention to provide a service-interval display for motor vehicles wherein energized pilot lights are associated with intervals of fixed distance, the light of each pilot light being extinguished at the end of the corresponding interval of fixed distance.

It is another object of the invention to provide a service-interval display for motor vehicles wherein indications of distance travelled are extinguished when the engine is started or immediately thereafter.

It is another object of the invention to provide a method of controlling a distance indication by use of factors related to engine load.

These and other objects, features, and advantages of the present invention will become more apparent from the following description when taken in combination with the accompanying drawing which shows, for the purposes of illustration only, one embodiment of the invention.

The drawing shows a circuit for a service-interval display wherein the distance travelled is estimated as a function of engine load.

Distance pulses entering the circuit at 1 correspond to the distance travelled and are triggered for example by means of a reed switch on the rear axle of the motor vehicle, to correspond to the revolutions of the wheels. The distance pulses pass through a type coder 1, which compensates for different wheel sizes and vehicle types, through modifiers $V_1$ to $V_5$ and then to a memory 2.

Type coder 1 may be constructed as a pulse counter the number of output pulses of which representing the number of input pulses occurring within a given time period. If different wheel sizes or vehicle types are to be accommodated, the counter may be set to produce a higher or lower number of pulses as a ratio or fraction of the input pulses 0, as desired.

This may be effected by initial design of the architecture of the counter if it is to be used on the same or equivalent vehicle or the counter may be made adjustable whereby the ratio of output pulses to input pulses may be changed as circumstances require. Modifier $V_1$ factors extreme loads on the engine resulting from a low temperature of an operating fluid, such as the engine oil for example. The output signal from an engine oil temperature sensor, not shown, is fed to a comparator 3, which delivers an output signal when the engine oil temperature falls below a preset temperature $\pi$ of 320 degrees Kelvin for example and then turns off modifier $V_1$. This means that modifier $V_1$ is operable above this temperature, and then reduces the number of pulses transmitted to modifier $V_2$.

Modifier $V_2$ measures the fuel consumption rate and likewise remains energized as long as this rate remains below a preset limiting value.

Modifier $V_3$ and $V_4$ monitor engine load as a function of high engine rpm. Modifier $V_3$ remains energized until a preset limiting rpm of 5,000 rpm for example is reached. Modifier $V_4$ remains operable until the rpm exceeds a second, higher limiting value of 6,000 rpm for example. Modifiers $V_3$ and $V_4$ thus monitor rpms of different magnitudes digitally.

The turnoff time of modifiers $V_1$ to $V_4$ can be set to last as long as the monitored extreme load on the engine exists. However, it can also be set for a fixed time or distance. Timers or travel pulse counters, not shown, can be used for this purpose to determine the turnoff time of the processor.

Modifiers $V_5$ delivers an output signal for preset fixed distances of 2,400 km for example. This distance exactly corresponds to the distance traveled if no extreme loads of any kind have been imposed on the engine. In the event of such loads, however, this distance, corresponding to the load factors generated by modifiers $V_1$ to $V_5$, is greater than the actual distance travelled. The ratio of the distance calculated with modifiers $V_1$ to $V_4$ and the actual distance traveled increases directly with the load on the engine.

The output pulses of modifier $V_5$ enter memory 2 designed as a shift register, said memory energizing its outputs 4 to 12 at intervals of 2,400 km of estimated travel, i.e., by calculation as a scaled factor of the actual distances travelled.

It will be appreciated that techniques exist for selectively controlling counter chains to accept trains of pulses and to transmit as output trains of pulses, modified from the input trains, in accordance with limits of physical parameters. In this regard, U.S. Pat. Nos. to Schmidt 3,209,130, Lowry, 3,172,208, Fenemore, et al., 2,880,512 and Dickerson, 2,651,204 are referenced as exemplary only.

Outputs 4 to 8 are connected through inverters 14 to 18 with LEDs 24 to 28, green for example, which are extinguished sequentially as these distances are covered. Depending on the driving style and other conditions, the LEDs remain lit for longer periods of time if the engine is driven more gently than a driving style with extreme load on the engine, based on a distance interval of 2,400 km.

The other outputs 9 to 12 of memory 2 are connected directly to LEDs 29 to 32, which are yellow or red for example. LED 29 is also controlled by a timer 33 and a connected OR element 34, which delivers an output signal after an operating time of 11 months for example has expired since the last maintenance. LED 29, which comes on after a fixed distance of 12,000 km has been travelled, corresponding to 5 output pulses from modifier $V_5$, is turned on after the fixed time set by timer 33 has elapsed, and in this case also indicates that service is required.

The other LEDs 30 to 32 intensify the urgency of the maintenance to be performed by indicating successively greater distances travelled after the limit indicated by LED 29.

Instead of purely digital modifiers $V_1$ to $V_4$, the load on the engine can also be monitored in an analog fashion. Computing elements can be provided for this purpose which multiply the incoming travel pulses by a factor which varies as a function of the operating parameter being monitored, or in the case of several operating parameters, generates the sum of such variable factors.

In order to prevent the driver from being unnecessarily disturbed by the display, at least LEDs 24 to 28 can be connected in series with an oil pressure switch 35 or the like. As long as the corresponding fixed distances have not yet been travelled, the LEDs will light up only until the operating criterion of the engine (the engine oil pressure in this case) is met.

It will be appreciated while the distance and time intervals such as $i_d$ and $i_t$ and the like have been disclosed as of equal magnitude, special circumstances may require variable and unequal intervals. By the same token, warning intervals need not be one half the magnitude of $i_d$ and $i_t$ but may assume some other relationship thereto.

While various modifiers had been shown in the preferred embodiment described above, these elements may be substituted with functionally equivalent components or circuits, such as processor elements, which implement the respective weighting of the values representative of input information supplied thereto.

While we have shown and described only one embodiment in accordance with the present invention, it is understood that the same is not limited thereto but is susceptible to numerous changes and modifications as known by one having ordinary skill in the art, and we therefor do not wish to be limited to the details shown and described herein, but intend to cover all such modifications as are encompassed by the scope of the appended claims.

What is claimed is:

1. A method for displaying a service-interval for a motor vehicle comprising the steps of:
   measuring the actual distance travelled by the motor vehicle,
   generating a service signal indicative of said service-interval, and
   controlling the occurrence of the service signal in accordance with a combination of a first component related to actual distance travelled and a second component being a function of a parameter of engine load to assert earlier said service signal when said engine experiences increased periods of higher loads.

2. Apparatus for displaying a service-interval for a motor vehicle having an engine comprising:
   measuring means for measuring actual distance travelled by the motor vehicle,
   display means for generating a service signal indicative of a fixed service interval,
   distance-modifying means interposed between the display means and the measuring means, said distance-modifying means being responsive to both a first component related to the actual distance travelled by the vehicle and a second component being a function of a parameter of engine load for controlling the occurrence of said service signal to assert earlier said service signal when said engine experiences increased periods of higher loads.

3. Apparatus for displaying a service-interval as set forth in claim 2 wherein said distance-modifying means further comprises excessive load means operable for controlling the time of occurrence of said service signal in response to an extreme value of the magnitude of the parameter of engine load.

4. Apparatus for displaying a service-interval as set forth in claim 2 wherein said distance-modifying means further comprises excessive load means for controlling the time of occurrence of said service signal when the magnitude of the parameter of engine load is above a predetermined limiting value.

5. Apparatus for displaying a service-interval as set forth in claim 3 wherein the time of occurrence of the service signal is determined by a fixed relationship of said parameter during periods of said extreme value.

6. Apparatus for displaying a service-interval as set forth in claim 3 wherein the time of occurrence of the service signal is controlled by a factor dependent upon changes of said parameter.

7. Apparatus for displaying a service-interval for a motor vehicle having an engine comprising:
   measuring means for measuring the actual distance travelled by the motor vehicle,
   display means for generating a service signal indicative of a fixed service interval,
   distance-modifying means interposed between the display means and the measuring means, said distance modifying means being responsive to both a first component related to the actual distance travelled by the motor vehicle and a second component related to a plurality of parameters of engine load for controlling the occurrence of said first signal.

8. Apparatus for displaying a service-interval in accordance with claim 7 wherein said second component is controlled by at least one of the parameters engine rpm, temperature of engine coolant, temperatures of engine lubricant or fuel consumption rate.

9. Apparatus for displaying a service-interval for a motor vehicle in accordance with one of the claims 2 or 7 wherein said service interval is subdivided into subintervals, said apparatus further comprising:
   respective pilot lights associated with each subinterval, and
   means for extinguishing each pilot light after the corresponding subinterval has elapsed.

10. Apparatus for displaying a service-interval in accordance with claim 9 comprising
    means for extinguishing the pilot lights when said engine is started.

11. Apparatus for displaying a service-interval as set forth in claim 9 comprising:
    display means including at least one warning light, each being associated with respective fixed distance intervals which elapse after the fixed service interval has elapsed and
    means for continuously lighting each of said warning lights after its respective distance interval has elapsed.

12. Apparatus for displaying a service-interval in accordance with one of claims 2 or 7 comprising:
    means for generating a second signal after a fixed time period, and
    means responsive to said second signal for controlling the generation of said first signal.

* * * * *